United States Patent [19]
Kim et al.

[11] Patent Number: 6,078,161
[45] Date of Patent: Jun. 20, 2000

[54] CURRENT CONTROL APPARATUS IN A SWITCHED RELUCTANCE MOTOR

[75] Inventors: Sung-lyeol Kim; Ji-hyun Kim, both of Suwon, Rep. of Korea

[73] Assignee: Samsung Electronics Co., Ltd., Suwon, Rep. of Korea

[21] Appl. No.: 09/044,794

[22] Filed: Mar. 20, 1998

[30] Foreign Application Priority Data

Mar. 20, 1997 [KR] Rep. of Korea .................. 97-9585

[51] Int. Cl.[7] ........................................... H02P 7/05
[52] U.S. Cl. ..................... 318/701; 318/254; 318/432
[58] Field of Search .................................. 318/254, 701, 318/720, 721, 722, 724, 432, 433

[56] References Cited

U.S. PATENT DOCUMENTS

| | | | |
|---|---|---|---|
| 5,166,591 | 11/1992 | Stephens et al. | 318/701 |
| 5,736,828 | 4/1998 | Turner et al. | 318/701 |
| 5,754,024 | 5/1998 | Sugiyama | 318/701 |

*Primary Examiner*—Bentsu Ro
*Attorney, Agent, or Firm*—Burns, Doane, Swecker & Mathis, L.L.P.

[57] ABSTRACT

Disclosed is a current controlling apparatus of a switched reluctance motor (SRM) having an inverter unit for variably switching the excitation state of each phase of the polyphase stator: generates a current controlling signal so that a current error between a current commanded by a current command unit and a current which is actually applied to the SRM can be compensated; and performs a pulse width modulation after receiving the current controlling signal and then supplies to the inverter unit, thereby enhancing efficiently the operating characteristic of the SRM by minimizing the current error. In other words, the current control apparatus in the SRM which searches for a current error by comparing a current controlling signal commanded by a current command unit with a current actually applied to the SRM and then operates the SRM by a current adjacent to the command current by compensating a current value corresponding to the compared current error. As a result, it is possible to reduce a noise caused by a torque ripple when rotating the motor and enhancing the efficiency of the motor.

4 Claims, 6 Drawing Sheets

CURRENT CONTROL APPARATUS IN A SWITCHED RELUCTANCE MOTOR

This application claims priority under 35 U.S.C. §§119 and/or 365 to Patent Application No. 97-9585 filed in Korea on Mar. 20, 1997; the entire content of which is hereby incorporated by reference.

BACKGROUND OF THE INVENTION

1. Field of the Invention

The present invention relates to a current control apparatus in a switched reluctance motor (SRM), and more particularly to a current control apparatus in a switched reluctance motor (SRM) which searches for a current error by comparing a current controlling signal commanded by a current command unit with a current actually applied to the SRM and then operates the SRM by a current adjacent to the command current by compensating a current value corresponding to the compared current error, thereby reducing a noise caused by a torque ripple when rotating the motor and enhancing the efficiency of the motor.

2. Description of the Related Art

Generally, a switched reluctance motor (SRM) is a kind of a reluctance motor which mainly includes: a polyphase stator which generates a magnetic force by binding an armature coil; a rotor which is rotated by a magnetic attractive force generated according to relative positions of a tooth and the magnetic force generated by the stator; and a position detecting unit which has a position detection sensing unit and a sensing plate and detects the position of the rotor by sensing a position detecting pulse by a resolution of a predetermined angle as the position of the rotor varies. Here, a plurality of teeth are symmetrically formed at the rotor, and the armature coil symmetrically binds each of the polyphase stator. The position detection sensing unit outputs the position detection pulse by detecting the position of the rotor and synchronizes with the position detection pulse, thereby successively driving the polyphase armature coils.

The power supplied to the armature coil which is bound to the polyphase stator is controlled by a switching element. At this time, by successively varying the excitation state between the rotor and the stator as the input pulse signal is applied to a controlling terminal of the switching element by synchronizing with the position detection pulse of the position detecting unit, a forward rotating torque corresponding to the input pulse signal can be generated at the rotor by the magnetic attractive force. Moreover, in the case that a specific excitation state is not varied, it is possible to stop the rotor at a predetermined position. In addition, by controlling the phase of the inputted pulse signal which is applied to the switching element based on the position where the inductance reaches at its maximum, an inverse rotating force can be generated. As described above, it is possible to widely apply the control operation in the various directions to the washing machine, etc.

At this time, to successively vary the excitation state of each phase, it is essential to sense the position of the rotor.

There are many prior arts which have been disclosed relating to the SRM, such as U.S. Pat. No. 4,748,387, "DC brushless motor driving method and apparatus for accurately controlling starting position of rotor" patented on May 1988; U.S. Pat. No. 4,990,843, "Reluctance motor" patented on February 1991; U.S. Pat. No. 5,111,095, "Polyphase switched reluctance motor" patented on May 1992; U.S. Pat. No. 5,461,295, "Noise reduction in a switched reluctance motor by current profile manipulation" patented on October 1995; and U.S. Pat. No. 5,539,293, "Rotor position encoder having features in decodable angular position" patented on July 1996.

Figure 1:
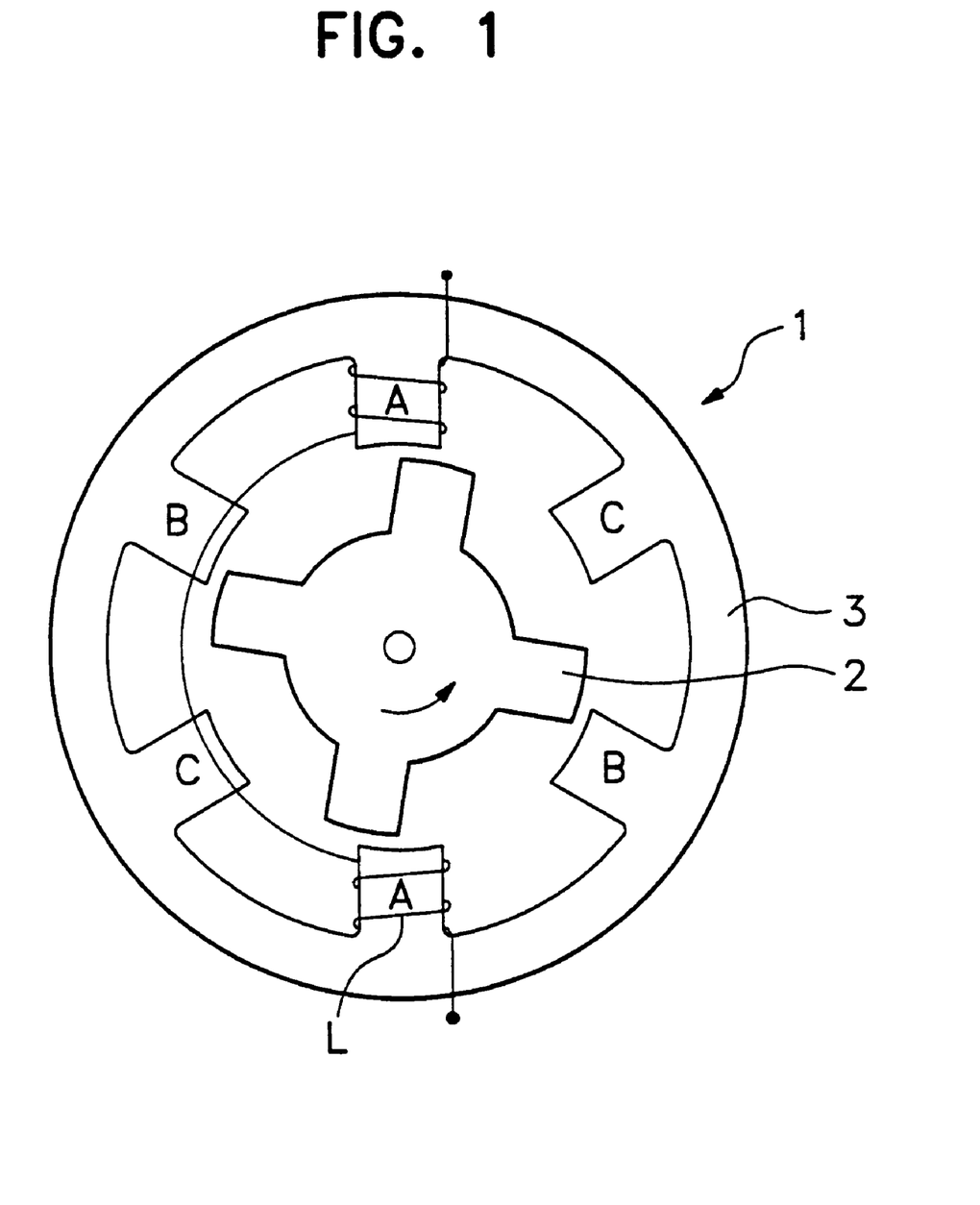
FIG. 1 is an illustrative view showing the inner structure of a conventional switched reluctance motor.

FIG. 1 is an illustrative view showing the inner structure of the conventional SRM. It illustrates a SRM having three phases of A, B and C.

In the conventional SRM 1, an armature coil L binds the core of the stator 3 located around the rotor 2. The torque can be generated by the magnetic attractive force functioning between the rotor 2 and the core of the stator 3 magnetized when electrifying the armature coil L. By successively electrifying the armature coil L of each A, B and C phase, it is possible to have a structure capable of rotating the rotor 2 to a desired direction.

Figure 2:
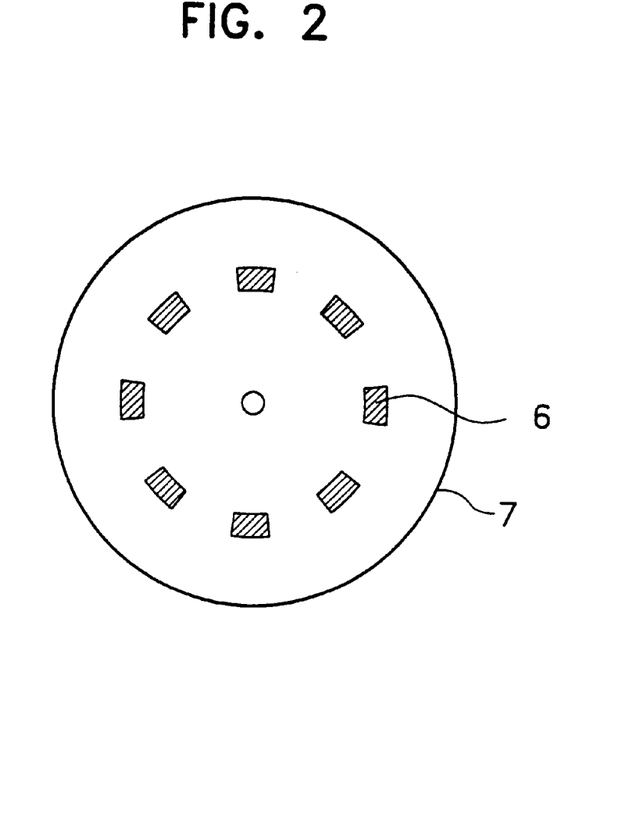
FIG. 2 is an illustrative view showing the structure of a sensor plate for sensing the position of a rotor of a conventional switched reluctance motor.

Moreover, inside of the conventional SRM 1, as shown in FIG. 2, a sensor plate 7 in which a plurality of slits 6 are formed along the concentric circumference is connected to the rotor 2. An optical sensor (not illustrated) having a light-emitting element and a light receiving element is located facing the slit 6. Accordingly, the light transmitted from the light-emitting element is transmitted through the slit 6 of the sensor plate 7 and then is incident upon the light receiving element, and thereby a predetermined detection pulse is generated. As a result, it is possible to detect the position of the rotor.

As described above, it is possible to generate the forward rotating torque or the reverse rotating torque by controlling the switching pulse applied to an inverter unit, which will be illustrated, according to the location of the detected rotor 2. Moreover, in the case that any specific excitation state is not varied, it is possible to stop the rotor at a predetermined position.

Figure 3:
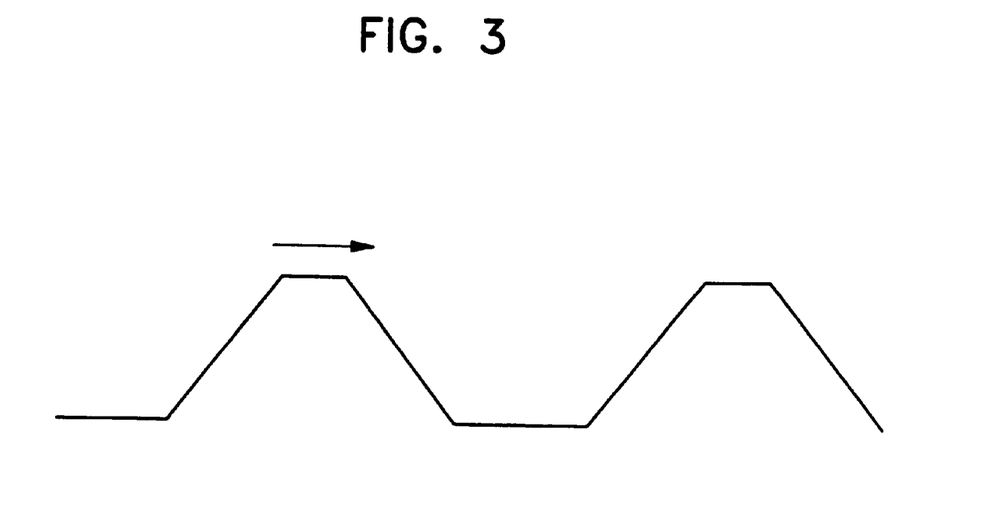
FIG. 3 is a wave form of an inductance of a conventional switched reluctance motor.

FIG. 3 is a wave form illustrating the inductance according to the relative position of the rotor 2 and the core out of a plurality of cores of the stator 3. Here, the waveform of the electrifying signal is formed when the rotor 2 shown in FIG. 1 is rotated in the direction of the arrow.

As shown in FIG. 3, as the rotor 2 approaches to a core having any phase out of the cores of stator 3, the inductance L increases. When the rotor 2 is aligned with a core of any phase, the inductance L reaches at its maximum. In addition, as the rotor 2 is located apart from a core having an any phase, the inductance L decreases. Conventionally, it is designed that the switching pulse can be evenly outputted at a position which is advanced as much as 0–7.5 degrees based on the time when the inductance L increases, irrelevantly to the rotating speed.

Due to the above-mentioned operating characteristic, it is recognized that the SRM is very environment-resistant and can generate a high torque at a high speed as it has no rectification limit. Moreover, as there is no brush in the SRM, it is easy to repair. However, in the case that the controlling the phase current using the switching pulse is inaccurate, the operating characteristic of the SRM is extremely degenerated.

Main factors which hinder the exact control of the phase current will be explained. As a current error between the current controlling signal which is commanded by the current command unit and the current which is actually applied to the SRM exceeds the allowable value and the current error is accumulated and spread, the SRM does not operate normally or the uneven rotating torque can be generated. Accordingly, as the current controlling apparatus of the conventional SRM cannot remove or compensate effectively the error current which is accumulated and spread, the rotating torque is degenerated and the noise is generated, thereby resulting in degenerating the entire efficiency of the SRM.

SUMMARY OF THE INVENTION

Therefore, it is an object of the present invention to provide a current control apparatus in a switched reluctance motor (SRM) for generating a rotating torque by variably switching the excitation state of each phase of a stator according to the relative position of a rotor to a polyphase stator, which searches for a current error by comparing a current controlling signal commanded by a current command unit with a current actually applied to the SRM and then operates the SRM by a current adjacent to the command current by compensating a current value corresponding to the compared current error, thereby reducing a noise caused by a torque ripple when rotating the motor and enhancing the efficiency of the motor.

The current controlling apparatus of the SRM having an inverter unit for variably switching the excitation state of each phase of the polyphase stator: generates a current controlling signal so that a current error between a current commanded by a current command unit and a current which is actually applied to the SRM can be compensated; and performs a pulse width modulation after receiving the current controlling signal and then supplies to the inverter unit, thereby enhancing efficiently the operating characteristic of the SRM by minimizing the current error.

BRIEF DESCRIPTION OF THE DRAWINGS

A more complete appreciation of the present invention, and may of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferable embodiments referring to the attached drawings.

Figure 4:
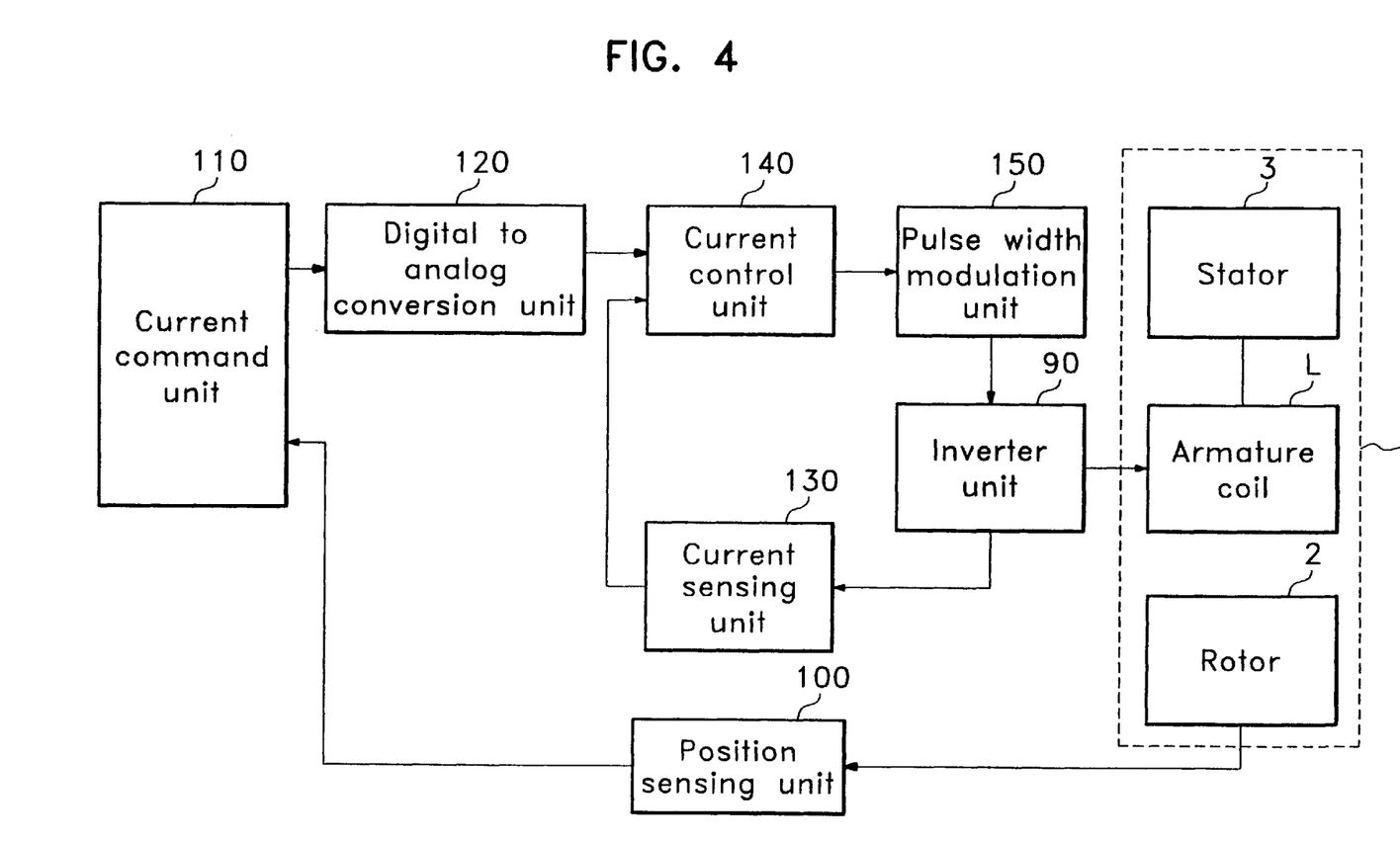
FIG. 4 is a block diagram illustrating a preferred embodiment of a switched reluctance motor according to the present invention.
Figure 5:
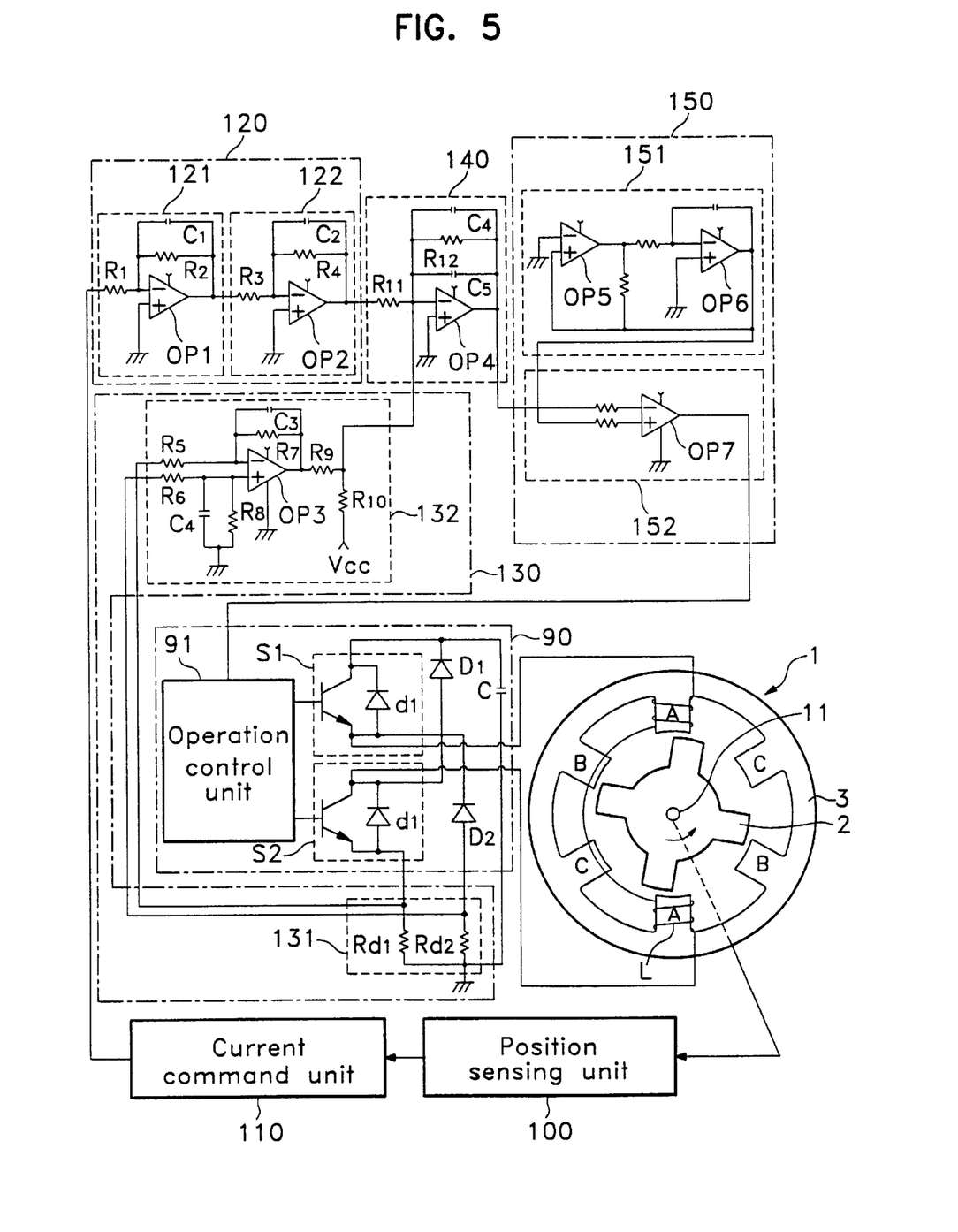
FIG. 5 is a detailed circuit diagram illustrating a preferred embodiment of the present invention.

FIG. 4 is a block diagram illustrating a preferred embodiment of a switched reluctance motor (SRM) according to the present invention; and FIG. 5 is a detailed circuit diagram illustrating a preferred embodiment of the present invention.

As shown in FIG. 4, a current controlling apparatus of the SRM 1 having an inverter unit 90 for variably switching the excitation state of each phase of the polyphase stator, includes: a position sensing unit 100 for sensing the relative position of a rotor to a polyphase stator which varies as the rotor is rotated, by a resolution of a predetermined angle; a current command unit 110 for conveying a current command through a switching pulse for supplying a current corresponding to the position of the rotor to the armature coil L which binds the stator; a digital to analog conversion unit 120 for generating a direct-current (DC) controlling voltage by performing a digital to analog conversion after receiving the switching pulse from the current command unit 110; a current sensing unit 130 which is electrically connected to the inverter unit 90 and senses the current which is actually applied to the armature coil L; a current controlling unit 140 which generates a current controlling signal so that a current error between the current command conveyed from the current command unit 110 and the current which is actually applied can be compensated, after receiving the outputs of the digital to analog conversion unit 120 and the current sensing unit 130; and a pulse width modulation unit 150 which drives the SRM 1 by performing a pulse width modulation after receiving the current controlling signal outputted from the current controlling unit 140 and then supplying it to the inverter unit 90.

The operation of the preferred embodiment of the SRM 1 according the present invention having the above-described structure will be explained, referring to the drawings.

As described above, the is constructed to generate the rotating torque in the desired direction by variably switching the excitation state of each phase of the stator according to the relative position of the rotor to the polyphase stator.

At this time, the inverter unit 90 acts a role in directly driving and controlling the motor by enabling an operation control unit 91 which receives the output of the pulse width modulation unit 150 to variably switch the excitation state of each phase of the polyphase stator.

Figure 6:
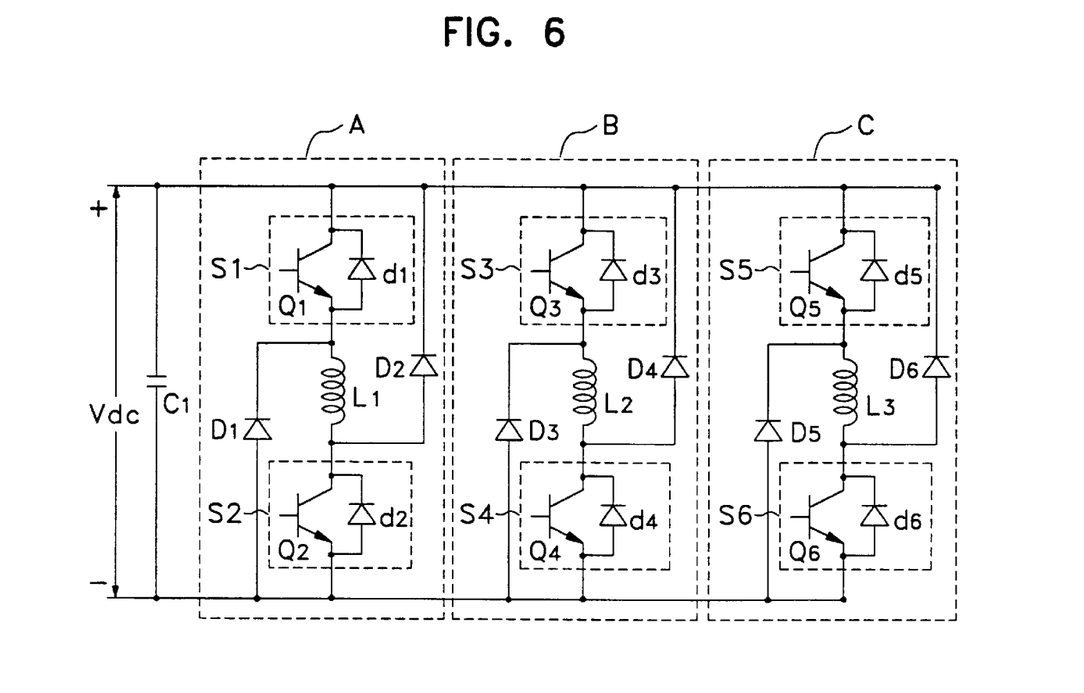
FIG. 6 is a circuit diagram illustrating an embodiment of an inverter unit of a switched reluctance motor capable of being employed in the present invention.

FIG. 6 is a circuit diagram illustrating one embodiment of the inverter unit 90 of the SRM 1 capable of being employed in the present invention.

The inverter unit 90 of the SRM 1 having three (3) phases, as shown in FIG. 6, includes: a first driving unit A for providing the rotor with the magnetic force proportioned to the magnetic flux of a first phase as the switching element is turned on by the inputted pulse signal; a second driving unit B for providing the rotor with the magnetic force proportioned to the magnetic flux of a second phase as the switching element is turned on by the inputted pulse signal; and a third driving unit C for providing the rotor with the magnetic force proportioned to the magnetic flux of a third phase as the switching element is turned on by the inputted pulse signal.

Here, the first driving unit A includes: a first armature coil L1 for generating the magnetic flux of the first phase; a first switching unit S1 having a first transistor Q1 which is connected to one end of the first armature coil L1 and controls the supplied power according to the inputted pulse signal which is inputted through the control terminal, and a first diode d1 for protecting the first transistor Q1 from the counter-electromotive force generated from the first armature coil L1 when the first transistor Q1 is turned on/off; a second switching unit S2 having a second transistor Q2 which is connected to the other end of the first armature coil L1 and controls the supplied power according to the inputted pulse signal which is inputted through the control terminal, and a second diode d2 for protecting the second transistor Q2 from the counter-electromotive force generated from the first armature coil L1 when the second transistor Q2 is turned on/off; a first current feedback diode D1 which is connected to one end of the first armature coil L1 and feeds back the current; and a second current feed back diode which is connected to the other end of the first armature coil L1 and feeds back the current. Each of the second and third phase driving units B and C has the same structure as the first phase driving unit A.

It is essential to sense the position of the rotor in order to successively operate the first phase driving unit A, the second phase driving unit B and the third phase driving unit C within the maximum top limit of the inductance of each phase, in the forward rotating direction. The inverter unit 90 switches the voltage state of the first, second and third phase driving units A, B and C based on the information about the relative position of the rotor to the polyphase stator. As a result, by varying the excitation state of the each phase of the stator, it is possible to rotate the rotor of the SRM 1 in the desired direction.

Moreover, the position detecting unit 100 senses the relative position of the rotor to the polyphase stator by a resolution of a predetermined angle which is decided by the location of the slits by sensing the position detecting pulse which is discretely generated by the light optically penetrating each slit of concentric slit groups, as the sensor plate is connected to the rotary shaft of the rotor and then is rotated.

Figure 7:
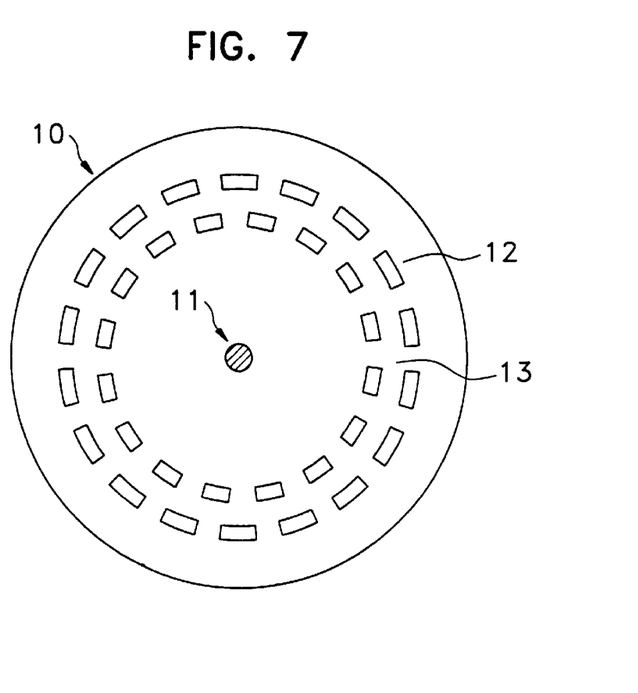
FIG. 7 is an illustrative view showing an embodiment of a sensor plate for sensing the position of a rotor according to the present invention.

FIG. 7 is an illustrative view showing an embodiment of the sensor plate for sensing the position of the rotor according to the present invention. Referring to the drawing, the position detecting unit 100 will be explained in detail.

As shown in the drawing, at the sensor plate 10, there are a first concentric slit group 12 having a plurality of slits which are perforated to have a resolution of a predetermined angle along the concentric circumference having a first radius, centering around the rotary shaft 11 of the rotor; and a second concentric slit group 13 having a plurality of slits which are perforated to have a resolution of a predetermined angle along the concentric circumference having a second radius smaller than the first radius, centering around the rotary shaft 11 of the rotor. Generally, slits constituting the first concentric slit group 12 and the second concentric slit group 13 are misaligned each other. As the sensor plate 10 is located at the upper end of the rotary shaft 11 of the rotor, it is rotated together with the rotor when the rotor of the motor is rotated. Here, the reason the slit groups each having a plurality of slits are used is to enhance the angle resolution for sensing the position of the rotor.

The position sensing unit 100 senses the position of the rotor through the position detecting pulse discretely generated by the light which optically penetrates the sensor plate 10 and the slits formed at the sensor plate 10.

The SRM 1 has an optical sensor (not illustrated) including a light-emitting element and a light receiving element therein facing the slits 6 in order to detect the position detecting pulse. The light transmitted from the light-emitting element when the sensor plate 10 is rotated together with the rotor is discretely incident upon the light receiving element by penetrating the slits of the sensor plate 10. At this time, as the light receiving element generates and outputs a predetermined position detecting pulse, the position sensing unit 100 receives the outputted position detecting pulse and then estimates the relative position of the rotor to the stator.

In the case that the conventional SRM senses the position of the rotor using a single optical sensor, it is impossible to fully catch the information on the position of the rotor which is necessary for the polyphase controlling. Accordingly, it is conventional to use a plurality of optical sensors in the SRM 1.

Figure 8A:
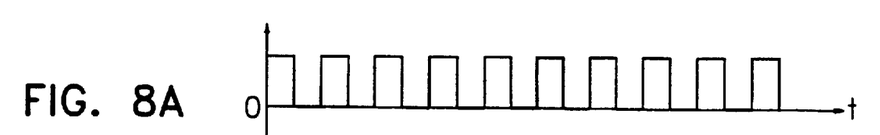
FIGS. 8A to 8G are waveforms illustrating outputs of main parts shown in a preferred embodiment of the present invention.

After that, the current command unit 110 conveys the current command through the switching pulse shown in FIG. 8A in order to supply the current corresponding to the position of the rotor to the armature coil L which binds the stator.

FIGS. 8A to 8G are waveforms showing outputs of the main parts of the preferred embodiment according to the present invention.

As the technology for producing the current command has already been disclosed in many previous patents, it is regarded as the conventional art in the present invention. The details are explained referring to the U.S. Pat. No. 5,461,295, "Noise reduction in a switched reluctance motor by current profile manipulation" patented October 1995.

As the command is conveyed from the current command unit 110 in the form of switching pulse, the digital to analog conversion unit 120 receives the output of the current command unit 110 and then generates the direct-current (DC) controlling voltage by performing the digital to analog conversion.

The digital to analog conversion unit 120 of the present invention, as shown in FIG. 5, includes: a first low-frequency filtering unit 121 which performs the digital to analog conversion through low-frequency filtering of the output of the current command unit 110; and a second low-frequency filtering unit 122 which performs the low-frequency filtering/smoothing of the output of the first low-frequency filtering unit 121.

Here, the first low-frequency filtering unit 121 includes: a first operational amplifier OP1 having an inverted input terminal for receiving the output of the current command unit 110 through a first resistance R1 and a non-inverted input terminal which is grounded; a second resistance R2 having one end which is connected to a contact between the first resistance R1 and the inverted input terminal of the first operational amplifier OP1 and the other end which is connected to an output terminal of the first operational amplifier OP1; and a first condenser C1 which is connected to the second resistance R2 in parallel. Digital to analog conversion of the output of the current command unit 110 is performed according to the time constant which is decided by the first resistance R1, the second resistance R2 and the first condenser C1.

Figure 8B:
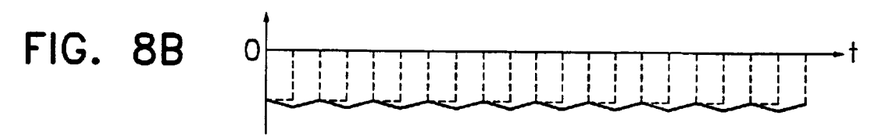

As the output of the current command unit 110 is received through the inverted input terminal of the first operational amplifier OP1, as shown in FIG. 8B, an output waveform which is inverted is formed. Based on the characteristic of the conventional system, as an ideal smoothing cannot be performed, a predetermined ripple is observed.

Moreover, the second low-frequency filtering unit 122 includes: a second operational amplifier OP2 having an inverted input terminal for receiving the output of the first low-frequency filtering unit 121 through a third resistance R3 and a non-inverted input terminal which is grounded; a fourth resistance R4 having one end which is connected to a contact between the third resistance R3 and the inverted input terminal of the second operational amplifier OP2 and the other end which is connected to an output terminal of the second operational amplifier OP2; and a second condenser C2 which is connected to both ends of a fourth resistance R4 in parallel. Here, the output of the first low-frequency filtering unit 121 is smoothed according to the time constant which is decided by the third resistance R3, the fourth resistance R4 and the second condenser C2.

Figure 8C:
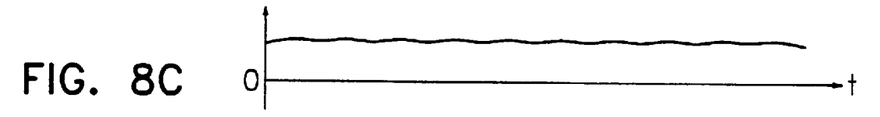

As the output of the first low-frequency filtering unit 121 is received through the inverted input terminal of the second operational amplifier OP2, as shown in FIG. 8C, it is possible to observe the output waveform which is non-inverted in which the ripple is almost removed.

The structure of the current sensing unit 130 is explained, referring to FIG. 5.

The current sensing unit 130 which is electrically connected to the inverter unit 90 and senses the current which is applied to the armature coil, includes: a current distributing resistance unit 131 and a differential amplifier 132.

Here, the current distributing resistance unit 131 includes: a first current distributing resistance $R_{d1}$ whose one end is grounded and the other end is connected in series to a closed circuit for generating the flux in the forward direction; a second current distributing resistance $R_{d2}$ whose one end is grounded and the other end is connected in series to the closed circuit for feeding back the counter-electromotive force.

The differential amplifier 132 includes: a third operational amplifier OP3 having an inverted input terminal which receives the output of the other end of the first current distributing resistance $R_{d1}$ through a fifth resistance R5 and a non-inverted input terminal which receives the output of the other end of the second current distributing resistance $R_{d2}$ through a sixth resistance R6 and outputs the received output through a ninth resistance R9; a seventh resistance R7 having one end which is connected to a contact between the fifth resistance R5 and the inverted input terminal of the third operational amplifier OP3 and the other end which is connected to an output terminal of the third operational amplifier OP3; a third condenser C3 which is connected to both ends of the seventh resistance R7 in parallel; a fourth condenser C4 having one end which is connected to a contact between the sixth resistance R6 and the non-inverted input terminal of the third operational amplifier OP3 and the other end which is grounded; an eighth resistance R8 having one end which is connected to a contact between the sixth resistance R6 and the non-inverted input terminal of the third operational amplifier OP3 and the other end which is grounded; and a tenth resistance R10 having one end which is connected to a negative power supply -Vcc in series and the other end is connected to the ninth resistance R9. The received output is outputted to the differential amplifier 132 through a contact between the ninth and tenth resistances R9 and R10.

By amplifying the differential voltage between the voltage corresponding to the current which is distributed from the first current distributing resistance Rd1 and the voltage corresponding to the current which is distributed from the second current distributing resistance Rd2, it is possible to sense the information on the current which is actually applied to the armature coil in the form of the voltage.

Figure 8D:
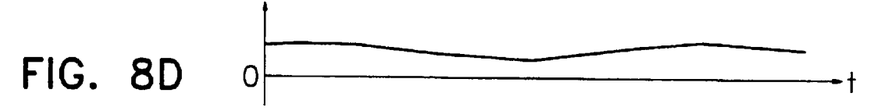

Moreover, the current controlling unit 140 receives the outputs of the digital to analog conversion unit 120 and the current sensing unit 130 and generates the current controlling signal shown in FIG. 8D so that the current error between the current command conveyed from the current command unit 10 and the current which is actually applied can be compensated.

The circuit structure of the current controlling unit 140 is explained referring to FIG. 5. As shown in the drawing, the current controlling unit 140 includes: a fourth operational amplifier OP4 having an inverted input terminal for receiving the output of the second low-frequency filtering unit 122 through an eleventh resistance R11 and the output of the differential amplifier 132 and a non-inverted input terminal which is grounded; and a twelfth resistance R12, a fourth condenser C4 and a fifth condenser C5 which are connected to the inverted input terminal and the output terminal of the fourth operational amplifier OP4 in parallel. Here, the current controlling signal is generated so that the current error between the current command conveyed from the current command unit 110 and the current which is actually applied can be compensated.

The pulse width modulation unit 150 includes: a triangular wave generating unit 151 which generates a triangular wave to modulate the pulse width of the current controlling signal; and a voltage comparator 152 which compares the output of the current controlling unit 140 with the output of the triangular wave generating unit 151 after receiving the output of the triangular wave generating unit 151 through the non-inverted terminal and the output of the current controlling unit 140 through the inverted terminal and generates compared output each having the different duty ratio according to the compared result. As a result, by performing the pulse width modulation regarding the outputs of the current controlling unit 140 and the triangular wave generating unit 151 and then supplying them the inverter unit 90, the SRM 1 is efficiently driven.

Figure 8E:
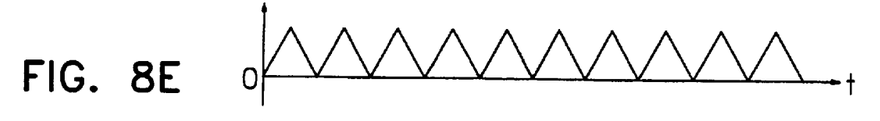
Figure 8F:
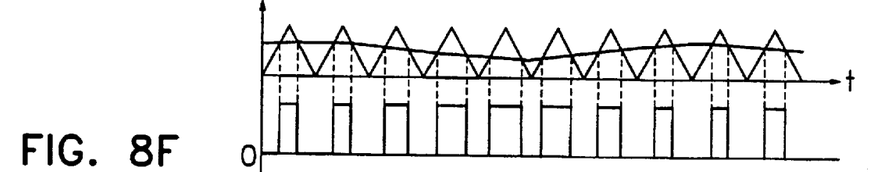

Here, the triangular wave generating unit 151 generates the desired triangular wave as shown in FIG. 8E by feeding back the outputs through the resistance elements and the capacitive reactance element using the fifth operational amplifier OP5 and the sixth operational amplifier OP6. The voltage comparator 152 generates output of high state through a comparator OP7 in the case that the output of the non-inverted terminal is larger than the output of the inverted terminal. In the case that the output of the non-inverted terminal is smaller than the inverted terminal, output of low state is generated. As a result, the pulse width modulation signal is generated, as shown in FIG. 8F.

Figure 8G:
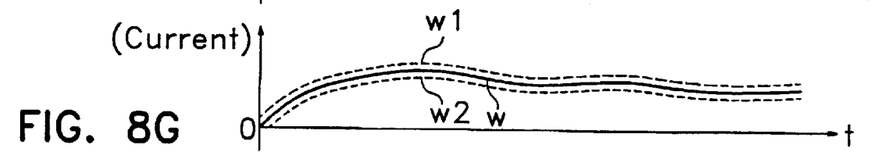

In the case that the waveform ω is an ideal current waveform which is applied to the armature coil by the current command conveyed from the current command unit 110, as shown in FIG. 8G, it is possible to compensate the actually applied current which is higher than the current command conveyed from the current command unit 110 such as ω1 indicated by a dotted line or which is lower than the current command conveyed from the current command unit 110 such as ω2 indicated by a dotted line, so that the actually applied current can approach to the waveform ω which is indicated with a solid line.

As the terminologies mentioned in the specification are determined based upon the functions in the present invention and they can be changed according to the technician's intention or a usual practice, the terminologies should be defined considering the overall contents of the specification of the present invention.

As described above, the current controlling apparatus of the SRM 1 having the inverter unit for variably switching the excitation state of each phase of the polyphase stator: generates the current controlling signal so that the current error between the current commanded by the current command unit and the current which is actually applied to the SRM 1 can be compensated; and performs the pulse width modulation after receiving the current controlling signal and then supplies it to the inverter unit, thereby enhancing efficiently the operating characteristic of the SRM by minimizing the current error. Moreover, the current control apparatus in the SRM which searches for a current error by comparing the current controlling signal commanded by the current command unit with the current actually applied to the SRM and then operates the SRM by the current adjacent to the command current by compensating the current value corresponding to the compared current error, thereby reducing a noise caused by a torque ripple when rotating the motor and enhancing the efficiency of the motor.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A current controlling apparatus of a switched reluctance motor (SRM) having an inverter unit for variably switching the excitation state of each phase of a polyphase stator, comprising:

a position sensing unit for sensing the relative position of a rotor to the polyphase stator which varies as said rotor is rotated, by a resolution of a predetermined angle;

a current command unit for conveying a current command through a switching pulse for supplying a current corresponding to the position of said rotor to an armature coil which binds said stator;

a current sensing unit which is electrically connected to said inverter unit and senses the current which is actually applied to the armature coil;

a digital to analog conversion unit for generating a direct-current (DC) controlling voltage by performing a digital to analog conversion after receiving the switching pulse from said current command unit;

a current controlling unit which generates a current controlling signal so that a current error between the current command conveyed from said current command unit and the current which is actually applied can be compensated, after receiving the outputs of said digital to analog conversion unit and said current sensing unit; and a pulse width modulation unit which drives the SRM by performing a pulse width modulation after receiving the current controlling signal outputted from said current controlling unit and then supplying it to said inverter unit, wherein said digital to analog conversion unit comprises:
      a first low-frequency filtering unit which performs the digital to analog conversion through low-frequency filtering of output of said current command unit; and
      a second low-frequency filtering unit which performs the low-frequency filtering/smoothing of output of said first low-frequency filtering unit.

2. The apparatus of claim 1, wherein said pulse width modulation unit comprises:

a triangular wave generating unit which generates a triangular wave to modulate the pulse width of said current controlling signal; and a voltage comparator which compares the output of said current controlling unit with the output of said triangular wave generating unit after receiving the output of said triangular wave generating unit through the non-inverted terminal and the output of said current controlling unit through the inverted terminal and generates compared output each having the different duty ratio according to the compared result to supply to said inverter unit.

3. A current controlling apparatus of a switched reluctance motor (SRM) having an inverter unit for variably switching the excitation state of each phase of a polyphase stator, comprising:

a position sensing unit for sensing the relative position of a rotor to the polyphase stator which varies as said rotor is rotated, by a resolution of a predetermined angle;

a current command unit for conveying a current command through a switching pulse for supplying a current corresponding to the position of said rotor to an armature coil which binds said stator;

a current sensing unit which is electrically connected to said inverter unit and senses the current which is actually applied to the armature coil;

a digital to analog conversion unit for generating a direct-current (DC) controlling voltage by performing a digital to analog conversion after receiving the switching pulse from said current command unit;

a current controlling unit which generates a current controlling signal so that a current error between the current command conveyed from said current command unit and the current which is actually applied can be compensated, after receiving the outputs of said digital to analog conversion unit and said current sensing unit; and a pulse width modulation unit which drives the SRM by performing a pulse width modulation after receiving the current controlling signal outputted from said current controlling unit and then supplying it to said inverter unit, wherein said current sensing unit comprises:
      a current distributing resistance unit including a first current distributing resistance whose one end is grounded and the other end is connected in series to a closed circuit for generating the flux in the forward direction, and a second current distributing resistance whose one end is grounded and the other end is connected in series to the closed circuit for feeding back the counter-electromotive force; and
      a differential amplifier which receives the outputs of said first and second current distributing resistances and then performs differential amplification of the outputs.

4. A current controlling apparatus of a switched reluctance motor (SRM) having an inverter unit for variably switching the excitation state of each phase of a polyphase stator, comprising:

a position sensing unit for sensing the relative position of a rotor to the polyphase stator which varies as said rotor is rotated, by a resolution of a predetermined angle;

a current command unit for conveying a current command through a switching pulse for supplying a current corresponding to the position of said rotor to an armature coil which binds said stator;

a current sensing unit which is electrically connected to said inverter unit and senses the current which is actually applied to the armature coil;

a digital to analog conversion unit for generating a direct-current (DC) controlling voltage by performing a digital to analog conversion after receiving the switching pulse from said current command unit;

a current controlling unit which generates a current controlling signal so that a current error between the current command conveyed from said current command unit and the current which is actually applied can be compensated, after receiving the outputs of said digital to analog conversion unit and said current sensing unit; and a pulse width modulation unit which drives the SRM by performing a pulse width modulation after receiving the current controlling signal outputted from said current controlling unit and then supplying it to said inverter unit, wherein said current controlling unit comprises:

an operational amplifier having an inverted input terminal for receiving the outputs of said digital to analog conversion unit and said current sensing unit and a non-inverted input terminal is grounded; and a first resistance, a first condenser and a second condenser which are connected to both input/output terminals of said operational amplifier in parallel, the current controlling signal being generated so that the current error between the current command conveyed from said current command unit and the current which is actually applied can be compensated.

* * * * *